United States Patent [19]

Lefkowitz

[11] Patent Number: 4,473,384

[45] Date of Patent: Sep. 25, 1984

[54] SEPARATOR

[76] Inventor: Leonard R. Lefkowitz, 14 Alpine Dr., Latham, N.Y. 12110

[21] Appl. No.: 461,760

[22] Filed: Jan. 28, 1983

[51] Int. Cl.$^3$ ............................ B01D 46/04; B01D 49/00
[52] U.S. Cl. ............................................ 55/290; 55/295;
   55/401; 55/409; 55/419; 55/446
[58] Field of Search ................. 55/113, 114, 121, 149,
   55/289, 290, 295, 296, 401, 402, 408, 409, 419,
   422, 446; 210/396; 261/DIG. 56

[56] References Cited

U.S. PATENT DOCUMENTS

| Re. 24,521 | 8/1958  | Young ............................ | 55/295 |
| 648,575    | 5/1900  | Scheiffler ....................... | 55/290 |
| 2,271,401  | 1/1942  | Sainty ............................ | 55/290 |
| 2,333,431  | 11/1943 | Lincoln .......................... | 55/114 |
| 3,500,614  | 3/1970  | Soo ................................. | 55/113 |
| 3,581,468  | 6/1971  | Gourdine et al. ............... | 55/114 |
| 3,983,743  | 10/1976 | Olin et al. ..................... | 55/270 |
| 4,006,938  | 2/1977  | Reiterer ......................... | 55/406 |
| 4,098,594  | 7/1978  | Shorr et al. ................... | 55/403 |
| 4,118,205  | 10/1978 | Wang .............................. | 55/408 |
| 4,118,207  | 10/1978 | Wilhelm ......................... | 55/338 |

FOREIGN PATENT DOCUMENTS 21621 2/1981 Japan .................................. 55/446
1144872 3/1969 United Kingdom .

OTHER PUBLICATIONS

Lundgren Impactor, Sierra Instruments, Bulletin No. 174-4220.
B. W. Soole et al., The Rotary Impaction Filter, Filtration and Separation, Sep./Oct. 1974, pp. 483-487 & 489.
Rotary Impaction Filter, National Research Development Corporation, Apr. 1973.

Primary Examiner—David L. Lacey
Attorney, Agent, or Firm—Witherspoon & Hargest

[57] ABSTRACT

A separator for separating particulate material from fluid having a feed conduit including a plurality of feed openings and a collector having open and closed areas. The feed openings are spaced from, parallel to and continuously substantially encompassed by a portion of the closed area of the collector. The collector is moveable relative to the feed openings. A discharge conduit and particulate removal apparatus are also provided.

7 Claims, 9 Drawing Figures

SEPARATOR

BACKGROUND OF THE INVENTION

The present invention relates to an impactor-type separator for separating particulate material from fluid.

Impactor separators for separating particulate material from fluid are known in the art. Generally, such separators provide for causing gas containing particulate material to be fed from a conduit and to impinge upon an impaction plate. A portion of the particulate material adheres to the plate and the gas continues along its flow path for further treatment.

One known prior art device is described in U.S. Pat. No. 4,006,938 which relates to distributing fibrous material into a silo while separating the material from the air flow used as the carrier medium. In this patent, an airfibrous material is fed from a conduit and is caused to impinge upon the surface of a flat rotating disc. Such disc comprises a perforated portion. In operation, a suction conduit draws the air of the air-fibrous material through the disc perforations. The combined action of the material impacting upon the disc surface and the centrifugal force generated by a high rotational speed of the disc, allows that fibrous material gathered upon the portion of the disc which is not perforated to fall from the disc and be collected as desired in a silo. The efficiency of devices of this type is dependent in part upon providing an adequate seal between the feeding conduit and the suction conduit so that the suction force draws the air through the disc perforations rather than draw some of the air-fibrous material around the edge of the disc. In addition, in view of the existence of perforations, the collecting or impacting surface is not continuous but rather is interrupted by such perforations. In such structure the size of the perforations must be such as to allow the air to pass through without also allowing the fibrous material to pass through. Accordingly, such devices are not particularly useful when the particles are micron-size since such small particles will pass through the perforations along with the air carrier.

The use of an impact rotary disc-like separator has also been used in filtering dust from air and in similar applications. In many applications very large quantities of gas must be cleaned. Prior to the use of rotary separators in such applications, use was made of conventional fiber mat filters. However, the impact efficiencies of the individual fibers are low at relatively low gas velocities. In use, acceptably high values are obtained by allowing the gas to pass over a large number of fibers such as are provided in the fiber mat filters. However, the use of a large number of fibers increases the resistance of the filter and decreases the gas flow velocity.

Improvements upon the fiber mat filters have been directed to increasing gas velocity to increase impaction efficiency so that few fibers are required thereby decreasing the resistance of the filter. To this end, known prior art includes fibers or filaments mounted radially like spokes from a hub of a disc. Rotation of the disc in a plane perpendicular to the gas flow allows the gas-borne particles to impact upon the filaments and allows centrifugal force to remove such impacted particles in contact with the filaments so that such particles may be collected as desired. Varying applications may use such impact filters. However, in certain applications it may be necessary to increase the number and diameter of the radially oriented filaments to such an extent as to undesirably increase the resistance of the filter and decrease the gas flow velocity. In addition, when solid particles are to be removed, it is necessary to moisten the filament. Separators of the foregoing type are described in British Pat. No. 1,144,872.

In one known prior art device particle laden air is drawn into such device and is accelerated through a converging nozzle of a first impactor stage. Particles leaving the nozzle separate into two portions. A first portion has sufficient inertia to impact upon the surface of a first drum. A second portion having less inertia flows with the air streamline to a second converging nozzle and the process is repeated. A plurality of converging nozzles each having a successively smaller slit width is provided in association with a plurality of successive drums. By successively decreasing nozzle slit width the air passing through the nozzles is accelerated to progressively higher velocities to remove smaller particles. However, as the air continues through the device there is a tendency for particulate material previously collected upon the drums to be dislodged by such air since the drum surface continues to lie in the direct path of the gas stream even after moving from a position adjacent to a converging nozzle.

In the apparatus described in U.S. Pat. No. 4,118,207, particulate laden gas, such as lint laden air in a clothes dryer, flows from an inlet conduit and engages the surface of a plurality of spaced discs having hollow portions adjacent the centers thereof. The gas passes through the spaces between the discs and through the hollow portions for discharge as desired. The lint moves adjacent the peripheries of the discs to be discharged through a discharge conduit. In such devices, the existence of the spaces between the discs provides a structure in which the collecting or impacting surface is interrupted by such spaces. Accordingly, such devices are not particularly useful when the particles are micron-size since such particles will pass from the inlet conduit directly to the spaces between the discs, and then to the hollow portions, along with the air carrier.

Other known devices are for use in various applications to collect particles from a gas stream so that the particles can be measured for size. An example of such use occurs in air pollution studies. For example, U.S. Pat. No. 3,983,743 describes impactors having a radial slot design. Such impactors are stacked to form a multi-stage cascade of impactors. In such a device, particulate laden gas flows through radial slots in a first impactor stage and larger particles impact on the first collection substrate. Then, the air-stream flows through the narrower slots in the second impactor stage, and smaller particles impact on the second collection substrate. The air flow continues and the radial slots in succeeding impactors are smaller at each succeeding stage. By providing radial slots, a circumferential flow pattern is created between impactor stages. As the air flow progresses through the device the resistance to such flow increases.

Accordingly, it is an object of this invention to provide a separator requiring no sealing mechanism between the inlet through which the particle laden gas flows and the outlet through which the cleaned gas flows.

Yet another object of this invention is to provide a separator in which the particle laden gas continuously impacts upon a collecting surface during operation of the apparatus.

Still another object of this invention is to provide a separator useful in separating micron-size particles from a gas.

A further object of this invention is to provide a separator which includes a particle collector which does not increase the resistance to gas flow causing a decrease in gas flow velocity to the extent of many prior art devices and yet which may be used in separating micron-size particles from a gas.

Still another object of this invention is to provide a separator which does not require the use of a moistener when solid particles are removed from a gas.

Another object of this invention is to provide a separator in which collected particulate material is not removed from the collector, and deposited back into the gas stream, by the flow of the gas through the apparatus after the collector moves from a position adjacent the inlet for the particle laden gas.

Another object of this invention is to provide a separator having an inlet for particle laden gas which is continuously adjacent to and substantially encompassed by a closed area of a collector.

SUMMARY OF THE INVENTION

This invention achieves these and other objects by providing a separator for separating particulate material from fluid comprising at least one feed conduit one end of which includes a plurality of feed openings. At least one collector is also provided comprising a surface having alternating collecting plates and fluid discharge openings. The collector surface is movable relative to the feed openings and each of the feed openings is spaced from, parallel to and continuously substantially encompassed by, a portion of an adjacent collecting plate. Means are associated with the collector for moving the collector relative to the feed openings. At least one discharge conduit communicates with the open area of the collector, and means associated with the collector remove particulate material from its closed area.

BRIEF DESCRIPTION OF THE DRAWINGS

This invention may be clearly understood by reference to the attached drawings in which.

DESCRIPTION OF THE PREFERRED EMBODIMENT

Figure 1:
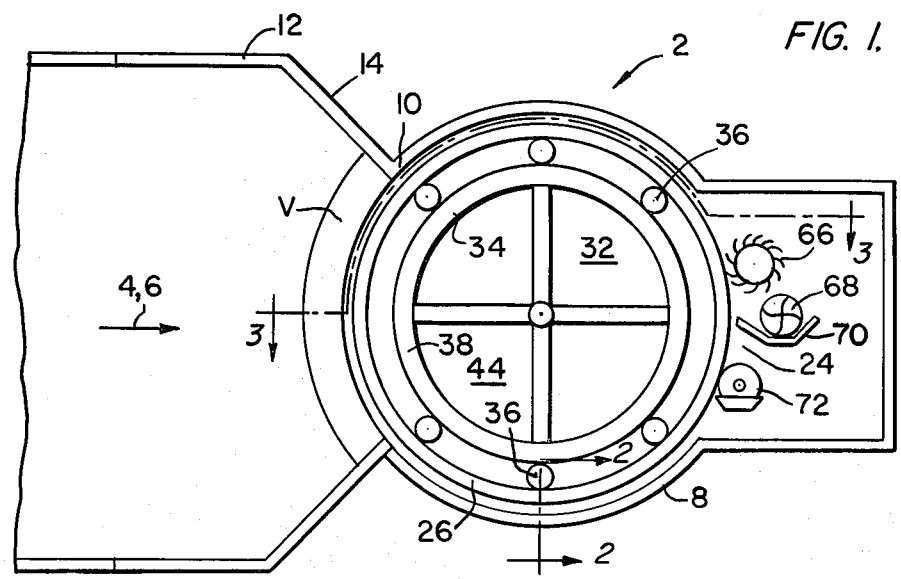
FIG. 1 is a side view of one embodiment of the present invention with the side removed.
Figure 2:
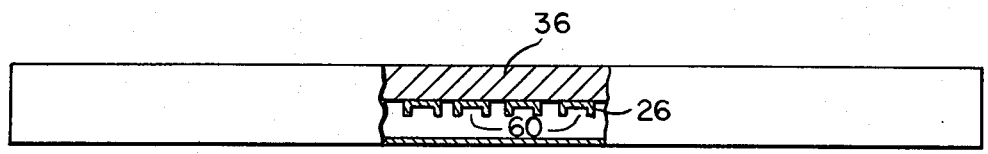
FIG. 2 is a partial sectional view taken along line 2—2 of FIG. 1.
Figure 3:
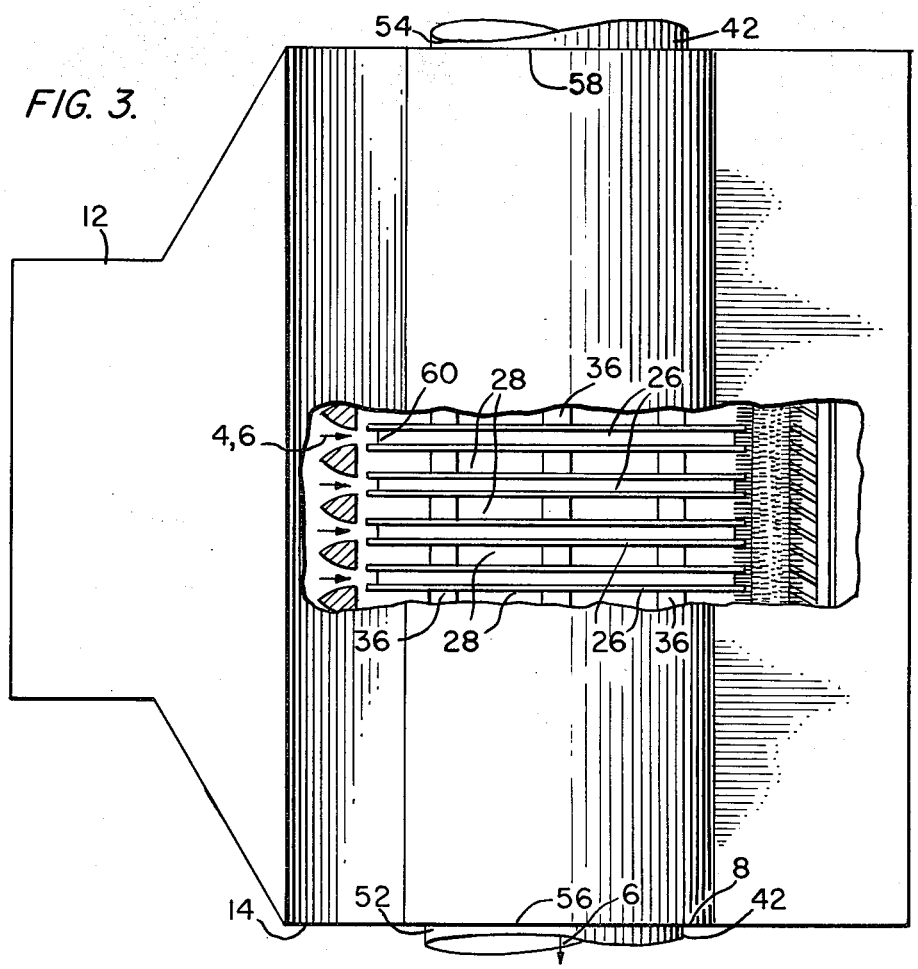
FIG. 3 is a partial sectional view taken along line 3—3 of FIG. 1.

The embodiment of this invention which is illustrated in the drawings is one which is particularly suited for achieving the objects of this invention. The drawings depict a separator 2 for separating particulate material 4 from fluid 6 comprising at least one feed conduit, one end of which includes a plurality of venturi-like chambers. In the preferred embodiment separator 2 comprises a housing 8 having an opening 10 therein. A feed conduit 12 is provided having one end 14 which includes a plurality of venturi-like chambers 16 each having a first opening 18, which communicates with conduit 12, and an opposing second opening or feed opening 20. Preferably the venturi unit generally designated V which includes the plurality of venturi-like chambers 16 is curved to conform to the configuration of the collector surface to be described hereinafter. The end 14 of feed conduit 12 is attached to housing 8 such that the chambers 16 communicate with opening 10 by means of openings 18. In this manner the fluid 6 containing particulate material 4 may be fed from conduit 12 into the housing 8, as for example, by means of a blower or fan (not shown) provided in conduit 12.

The venturi unit V may be designed, if desired as a module which may be interchanged with similar modules having venturi-like chambers of differing dimensions, having a different total quantity of venturi-like chambers, or having any other deviation from the venturi-like chambers depicted in the drawings provided such deviation falls within the invention as described and claimed herein.

Figure 4:
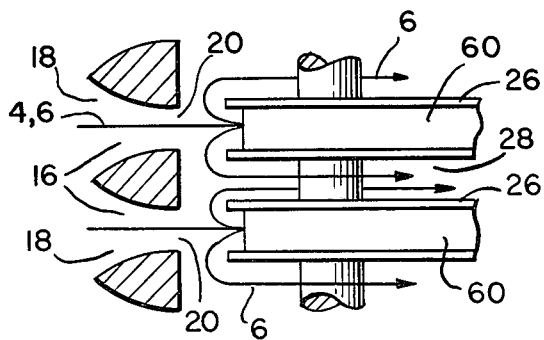
FIG. 4 is an enlarged view of a portion of the cutaway section of FIG. 3.
Figure 5:
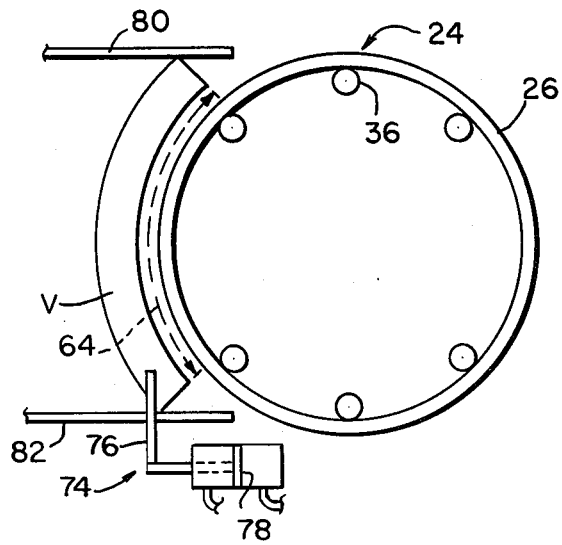
FIG. 5 is a diagramatic representation of the venturi unit and collector of the present invention.

At least one collector is provided comprising a surface having alternating collecting plates and fluid discharge openings, the collector being positioned such that the feed openings are spaced from, parallel to and continously substantially encompassed by, a portion of an adjacent collecting plate. The collector is moveably mounted for movement of the collector surface relative to the feed openings. For example, in the preferred embodiment a collector 24 is provided comprising a plurality of axially spaced generally circumferentially extending collecting plates 26. The spaces between plates 26 form fluid discharge openings 28. Plates 26 are depicted as enclosing a cavity 32. In particular, in the embodiment depicted in FIGS. 1 to 5, collector 24 is shown as a cylindrical drum 34 having an internal cavity 32 and an external surface comprising axially spaced circumferentially extending collecting plates 26. As noted, the venturi unit V is curved to generally conform to the surface of the collector as best shown in FIGS. 1 and 5. Plates 26 are supported to form the cylindrical drum 34 by means of axially extending rods 36 which may be supported by a plurality of axially spaced supporting members 38 (only one is shown) attached to rods 36. In such configuration, plates 26 are shown as being attached to rods 36. Plates 26 and supporting members 38 may be attached to rods 36 in any manner which will provide structural stability. By way of example only, such attachment may be by welding in those instances where the rods, plates and supporting members are metal. The cylindrical drum 34 is rotatably mounted within housing 8. Although such mounting is not shown, any means known in the art may be provided for mounting and rotating drum 34 within housing 8 relative to the feed openings 20 at any desired rotational rate.

If desired the housing may be omitted and a plurality of venturi units V may be positioned about the periphery of the drum 34, such units V being spaced such that means for removing the particulate material from the collector as described hereinafter may be positioned between adjacent of such units.

In an alternative embodiment, a plurality of venturi units and collectors may be placed in tandem such that as gas is cleaned in a first venturi unit/collector combination, such air may be subsequently further cleaned in a second venturi/collector combination, and then a third or however many other such combinations are desired. Similarly, if desired, subsequent venturi unit/collector combinations may vary in size and configuration or in any other manner from preceeding combinations.

At least one discharge conduit is provided which communicates with the fluid discharge openings of the collector. In the embodiment depicted in the drawings, the discharge conduit 42 communicates with cavity 32 to communicate with openings 28. Preferably, at least one end of the cavity is open and the discharge conduit communicates with the cavity at such open end. For example, cavity 32 inside of drum 34 has an open end 44, and if desired an open end at the opposite end of the drum, such open ends resulting from openings in the ends of the drum 34. By attaching the ends 52, 54 of discharge conduit 42 to housing 8 at housing openings 56, 58 respectively, the discharge conduit 42 communicates with cavity 32, through openings 56, 58 to communicate with the fluid discharge openings 28. Of course, openings 28 are provided by axially spacing the circumferentially extending plates 26 as described herein.

In an alternative embodiment the ends of the drum may be closed allowing for the discharge conduit to communicate with the open area or openings 28 by virtue of the gas flowing through the drum in a radial direction. For example, in such an embodiment the gas may enter the cavity through the openings 28 adjacent the feed openings 20 and exit from the cavity through the openings 28 at some other portion circumferentially spaced from the area of entry such as at a portion 90° or 180° from the area of entry.

In the preferred embodiment, collecting plates 26 comprise U-shaped channels 60 a portion of which are spaced from, parallel to and continuously substantially encompass an adjacent feed opening 20. This structure is best depicted in FIGS. 4 and 5 which show a portion 64 of each U-shaped plate 26 as being adjacent to a respective feed opening 20 and as substantially encompassing such opening. By substantially encompassed is meant that each collecting plate, such as is provided by plates 26, is equal to or greater than the width and height of an adjacent feed opening 20. In such an embodiment, each feed opening 20 is continuously adjacent to and substantially encompassed by a collecting plate whether or not there is movement of the collector.

Means are provided associated with the collector for removing particulate material from the collector plate. For example, the drawings depict an elongated cylindrical brush 66 mounted within housing 8 for engagement with and rotation relative to the plates 26 as plates 26 move past the brush. In this manner, particulate material which has accumulated upon the plates may be removed. Such removal means also is shown as including a screw-type conveyor 68 which removes the particulate material which has been brushed from plates 26 and deposited into bin 70.

Although not necessary, the efficiency of the collector may be increased by modifying its surface by modifying the surface texture of the plates or by coating the plates with a sticky or viscous substance. For example, a plate oiling device 72 may be provided for applying oil or some other substance to the plates 26 to facilitate the collection of particulate material upon such plates.

Means may be provided for varying the distance of the gap between the feed openings and the collector. Such variation may be caused to occur during operation of the separator, if desired. For example, hydraulic or pneumatic means 74 have been diagramatically depicted as being attached to venturi unit V through a connecting rod 76. Movement of the piston 78 will cause venturi unit V to slide upon guide rails 80, 82 as desired. Alternatively, means may be provided for causing the collector to move towards or away from the feed openings.

Figure 6:
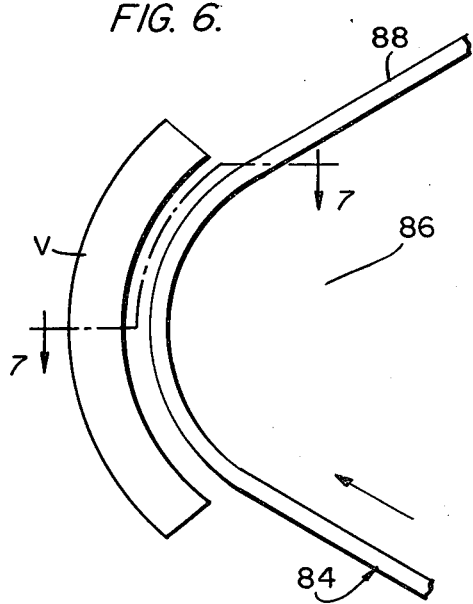
FIG. 6 is a partial diagramatic representation of another embodiment of the present invention.
Figure 7:
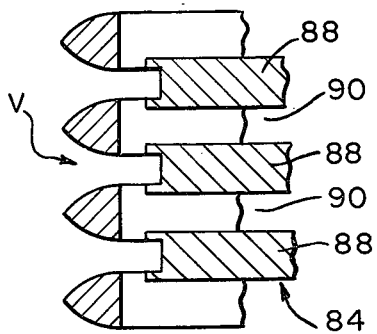
FIG. 7 is a sectional view taken along line 7—7 of FIG. 6.
Figure 9:
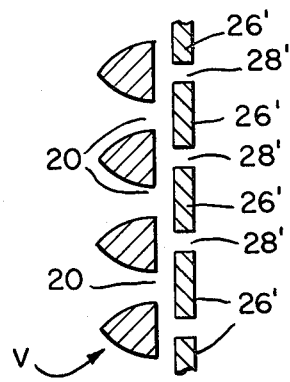

In an alternative embodiment, the collector, may comprise a looped belt 84 diagramatically depicted in FIGS. 6 and 7 having an internal cavity 86 and what may be referred to as a line or axis about which the belt 84 generally rotates relative to the feed openings of a venturi unit V. The external surface of belt 84 comprises a plurality of axially spaced collecting plates or strips 88 which extend generally circumferentially about such external surface. The spaces between plates 88 form fluid discharge openings 90. The openings 90 communicate with cavity 86.

Figure 8:
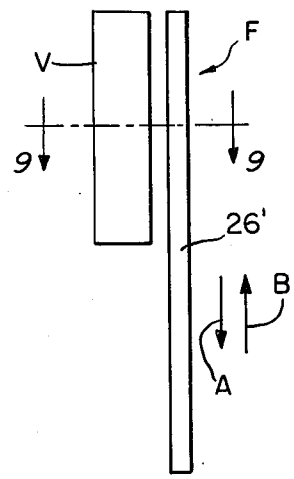
FIG. 8 is a partial diagramatic representation of another embodiment of the present invention; and, FIG. 9 is a sectional view taken along line 9—9 of FIG. 8.

In another alternative embodiment, the collector may comprise a substantially flat member F as depicted in FIG. 8. Such member includes a collector surface having alternating collecting plates 26' and fluid discharge openings 28' as described herein. Any means known in the art may be used to cause the flat member F to move relative to feed openings 20. Preferably such means will cause member F to reciprocate relative to openings 20 in the direction of arrows A and B.

In those instances where the collector is not enclosed, as for example, by a housing 8, it may be necessary to provide sealing means at the interface between the feed openings and collector to prevent leakage at such interface. It may also be desirable to provide an exhaust fan or blower downstream of the apparatus, as for example, in the discharge conduit to pull the particulate laden fluid from the feed conduit and through the apparatus described herein.

It will be apparent that the apparatus described herein has many applications and can be altered to accomplish specific gas cleaning as desired without deviating from the scope of the claims. For example, if desired an electrical charge may be placed upon the collector to facilitate the collecting of particulate material and such collector may be subsequently subjected to a charge reversal to dislodge or repulse such particles during cleaning of the collector.

In operation, fluid 6 containing particulate material 4 is caused to enter the separator 2 in a known manner and to pass through feed conduit 12. The particle laden fluid enters end 14 of conduit 12, flows through openings 18 and the venturi-like chambers 16 and exits through the feed openings 20 to impinge upon the closed area formed by plates 26 of the collector 24. Since feed openings 20 are continuously adjacent to and substantially encompassed by plates 26, the particle laden fluid continuously impacts upon the collecting surface or closed area defined by plates 26 during the separating operation so that the collecting surface or plates 26 remain a collecting surface for its entire period of exposure to the incoming fluid stream. The velocity of the fluid impinging against the collector which is depicted in the preferred embodiment as a cylindrical drum causes the particulate material 4 to bear against the plates 26 and be carried thereby, during rotation of the drum 34 to the particulate removing means which is depicted as brush 66. During such movement of the plates 26 the particulate material bearing against the plates is removed away from the feed openings and the fluid flow for removal of the particulate material from the plates. As shown, brush 66 rotates about its axis to remove the particulate material from the strips 26 as the strips move past the brush. The particulate material in turn falls upon the bin 70 and is removed by conveyor 68.

When the particulate laden fluid impinges upon plates 26, the particulate material bearing against the plates to be carried to the particulate removing means, the remaining fluid is deflected from the plates and flows through the fluid discharge openings or open area 28 into cavity 32. From cavity 32, the fluid enters discharge conduit 42 for discharge as desired.

Throughout the operation separation occurs without the need for a sealing mechanism between the feed openings 20 and the discharge conduit 42, and the particulate laden fluid continuously impacts upon the collecting surface provided by plates 26 thereby allowing for separating micron-size particles from a fluid if desired. In addition, the separation of micron-size particles from a fluid may be obtained without reducing the fluid discharge openings of the collector provided between plates 26, and therefore the resistance to fluid flow is not increased and a corresponding decrease in fluid flow velocity is not incurred. Solid materials are readily removed without the use of a moistener, although if desirable the strip oiling device 72 may be used to further facilitate collecting particulate material in some applications. The particulate material is removed from the vicinity of the feed openings and ultimately completely removed from housing 8 without being exposed to the flow or fluid stream passing through the fluid discharge openings 28. In this manner, the particulate material is not prematurely removed from the collector and deposited back into the fluid stream. This aspect of the invention is facilitated because the feed openings are spaced from, parallel to and continuously substantially encompassed by, a portion of an adjacent collecting plate.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A separator for separating particulate material from fluid comprising,
    at least one feed conduit one end of which includes a plurality of feed openings;
    at least one collector comprising a cylindrical drum having an internal cavity, the external surface of said drum forming a collector surface comprising a plurality of axially spaced circumferentially extending collecting plates the spaces between said plates forming fluid discharge openings, said drum being rotatably mounted for movement relative to said feed openings, each of said feed openings being spaced from, parallel to and continuously substantially encompassed by, a portion of an adjacent collecting plate,
    at least one discharge conduit communicating with said fluid discharge openings; and,
    means positioned and arranged with respect to said at least one collector for removing particulate material from said collector plates.

2. The separator of claim 1 wherein said one end includes a plurality of venturi-like chambers each of which comprises a first opening which communicates with said at least one feed conduit and an opposing second opening which forms one of said feed openings.

3. The separator of claim 2 wherein said at least one discharge conduit communicates with said cavity to communicate with said fluid discharge openings.

4. The separator of claim 3 wherein at least one end of said cavity is open and said at least one discharge conduit communicates with said cavity at said at least one open end.

5. The separator of claim 2 wherein each of said collecting plates comprises a U-shaped channel facing one of said feed openings.

6. The separator of claim 2 further including a housing having at least one opening therein, said one end of said feed conduit being attached to said housing and said feed openings communicating with one of said at least one housing opening, said at least one collector being rotatably mounted within said housing.

7. The separator of claim 6 wherein each of said collector plates comprises a U-shaped channel facing an adjacent one of said feed openings.

* * * * *